United States Patent
Hall (10) Patent No.: US 9,063,927 B2
(45) Date of Patent: Jun. 23, 2015

(54) SHORT MESSAGE AGE CLASSIFICATION (75) Inventor: Michael Aaron Hall, Valencia, CA (US)

(73) Assignee: CitizenNet Inc., Los Angeles, CA (US)

( * ) Notice: Subject to any disclaimer, the term of this patent is extended or adjusted under 35 U.S.C. 154(b) by 610 days.

(21) Appl. No.: 13/441,386

(22) Filed: Apr. 6, 2012

(65) Prior Publication Data
US 2012/0259619 A1  Oct. 11, 2012

Related U.S. Application Data

(60) Provisional application No. 61/472,527, filed on Apr. 6, 2011.

(51) Int. Cl.
*G06F 17/27* (2006.01)
*G06Q 30/00* (2012.01)

(52) U.S. Cl.
CPC .................................. *G06F 17/2785* (2013.01)

(58) Field of Classification Search
USPC ............................................................ 704/9
See application file for complete search history.

(56) References Cited

U.S. PATENT DOCUMENTS

| | | | |
|---|---|---|---|
| 5,465,309 A | 11/1995 | Johnson | |
| 5,835,087 A | 11/1998 | Herz et al. | |
| 5,999,902 A | 12/1999 | Scahill et al. | |
| 6,515,681 B1 | 2/2003 | Knight | |
| 6,571,225 B1 | 5/2003 | Oles et al. | |
| 6,571,234 B1 | 5/2003 | Knight et al. | |
| 6,766,349 B1 | 7/2004 | Belkin | |
| 7,080,139 B1 | 7/2006 | Briggs et al. | |
| 7,089,226 B1 | 8/2006 | Dumais et al. | |
| 7,421,395 B1 | 9/2008 | Link et al. | |
| 7,603,349 B1 | 10/2009 | Kraft et al. | |
| 7,657,515 B1 | 2/2010 | Jewell | |
| 7,734,627 B1 | 6/2010 | Tong | |
| 7,743,051 B1 | 6/2010 | Kashyap et al. | |
| 7,809,795 B1 * | 10/2010 | Cooley et al. | 709/206 |
| 7,860,928 B1 | 12/2010 | Anderson | |
| 7,917,528 B1 | 3/2011 | Dave et al. | |
| 7,925,496 B1 | 4/2011 | Rubin | |
| 7,933,818 B1 | 4/2011 | Kumar et al. | |
| 7,941,437 B2 | 5/2011 | Cooley | |
| 8,086,631 B2 | 12/2011 | Gollapudi et al. | |
| 8,301,616 B2 | 10/2012 | Guha et al. | |
| 8,380,697 B2 | 2/2013 | Benyamin et al. | |
| 8,504,550 B2 | 8/2013 | Hall et al. | |
| 8,554,854 B2 | 10/2013 | Benyamin et al. | |
| 8,612,293 B2 | 12/2013 | Benyamin et al. | |
| 8,615,434 B2 | 12/2013 | Benyamin et al. | |
| 9,002,892 B2 | 4/2015 | Benyamin et al. | |
| 2002/0016787 A1 | 2/2002 | Kanno | |

(Continued)

OTHER PUBLICATIONS

Schler et al, "Effects of age and gender on blogging", 2006, In Proceedings of AAAI Spring Symposium on Computational Approaches for Analyzing Weblogs, 2006, pp. 1-7.*

(Continued)

*Primary Examiner* — Olujimi Adesanya
(74) *Attorney, Agent, or Firm* — KPPB LLP (57) ABSTRACT

Systems and methods for short message age classification in accordance with embodiments of the invention are disclosed. In one embodiment of the invention, classifying messages using a classifier includes determining keyword feature information for a message using the classifier, classifying the determined feature information using the classifier, and estimating user age using the classifier.

19 Claims, 6 Drawing Sheets

(56) References Cited

U.S. PATENT DOCUMENTS

| | | | |
|---|---|---|---|
| 2002/0062368 A1 | 5/2002 | Holtzman et al. | |
| 2002/0123928 A1 | 9/2002 | Eldering et al. | |
| 2003/0028595 A1 | 2/2003 | Vogt et al. | |
| 2003/0164855 A1 | 9/2003 | Grant et al. | |
| 2003/0212673 A1 | 11/2003 | Kadayam et al. | |
| 2004/0133471 A1 | 7/2004 | Pisaris-Henderson et al. | |
| 2005/0080613 A1 | 4/2005 | Colledge et al. | |
| 2005/0080856 A1 | 4/2005 | Kirsch | |
| 2005/0144462 A1* | 6/2005 | LaGarde | 713/184 |
| 2005/0204002 A1 | 9/2005 | Friend | |
| 2006/0069589 A1 | 3/2006 | Nigam et al. | |
| 2006/0156326 A1 | 7/2006 | Goronzy et al. | |
| 2006/0184800 A1* | 8/2006 | Rosenberg | 713/186 |
| 2006/0242128 A1 | 10/2006 | Goel | |
| 2006/0253437 A1 | 11/2006 | Fain et al. | |
| 2006/0282328 A1 | 12/2006 | Gerace et al. | |
| 2007/0033104 A1 | 2/2007 | Collins et al. | |
| 2007/0061195 A1 | 3/2007 | Liu et al. | |
| 2007/0067439 A1* | 3/2007 | Mason et al. | 709/224 |
| 2007/0106500 A1 | 5/2007 | Loofbourrow et al. | |
| 2007/0124432 A1 | 5/2007 | Holtzman et al. | |
| 2007/0192106 A1* | 8/2007 | Zilca | 704/270 |
| 2007/0239433 A1* | 10/2007 | Chaski | 704/9 |
| 2007/0260580 A1 | 11/2007 | Omoigui | |
| 2007/0288433 A1 | 12/2007 | Gupta et al. | |
| 2008/0021884 A1 | 1/2008 | Jones et al. | |
| 2008/0059488 A1 | 3/2008 | Iyengar et al. | |
| 2008/0091670 A1 | 4/2008 | Ismalon | |
| 2008/0140502 A1 | 6/2008 | Birnholz et al. | |
| 2008/0172368 A1 | 7/2008 | Chowdhury et al. | |
| 2008/0215607 A1* | 9/2008 | Kaushansky et al. | 707/102 |
| 2008/0221892 A1 | 9/2008 | Nathan et al. | |
| 2008/0222142 A1 | 9/2008 | O'donnell | |
| 2008/0243842 A1 | 10/2008 | Liang et al. | |
| 2008/0294624 A1 | 11/2008 | Kanigsberg et al. | |
| 2008/0313215 A1 | 12/2008 | Beker et al. | |
| 2009/0017798 A1 | 1/2009 | Pop | |
| 2009/0049029 A1 | 2/2009 | Choi et al. | |
| 2009/0049127 A1 | 2/2009 | Juan et al. | |
| 2009/0063469 A1 | 3/2009 | Gross | |
| 2009/0070219 A1 | 3/2009 | D'Angelo et al. | |
| 2009/0070346 A1 | 3/2009 | Savona et al. | |
| 2009/0100042 A1 | 4/2009 | Qiao | |
| 2009/0109872 A1 | 4/2009 | Skubacz et al. | |
| 2009/0119167 A1 | 5/2009 | Kendall et al. | |
| 2009/0119261 A1 | 5/2009 | Ismalon | |
| 2009/0164464 A1 | 6/2009 | Carrico et al. | |
| 2009/0171686 A1 | 7/2009 | Eberstadt | |
| 2009/0177754 A1 | 7/2009 | Brezina et al. | |
| 2009/0216696 A1 | 8/2009 | Downs et al. | |
| 2009/0234815 A1 | 9/2009 | Boerries et al. | |
| 2009/0276285 A1 | 11/2009 | Nomula | |
| 2009/0282047 A1* | 11/2009 | Lin et al. | 707/10 |
| 2009/0319342 A1* | 12/2009 | Shilman et al. | 705/10 |
| 2010/0049534 A1 | 2/2010 | Whitnah et al. | |
| 2010/0114562 A1* | 5/2010 | Hutchinson et al. | 704/9 |
| 2010/0169327 A1 | 7/2010 | Lindsay et al. | |
| 2010/0203876 A1* | 8/2010 | Krishnaswamy | 455/418 |
| 2010/0223279 A1 | 9/2010 | Scott | |
| 2010/0228614 A1 | 9/2010 | Zhang et al. | |
| 2010/0268628 A1 | 10/2010 | Pitkow et al. | |
| 2010/0293170 A1 | 11/2010 | Hall et al. | |
| 2010/0306249 A1 | 12/2010 | Hill et al. | |
| 2011/0060794 A1 | 3/2011 | Sweeney | |
| 2011/0078130 A1 | 3/2011 | Roizen et al. | |
| 2011/0093336 A1 | 4/2011 | Calabria | |
| 2011/0093455 A1 | 4/2011 | Benyamin et al. | |
| 2011/0131207 A1* | 6/2011 | Jonsson | 707/730 |
| 2011/0145348 A1 | 6/2011 | Benyamin et al. | |
| 2011/0170777 A1 | 7/2011 | Inagaki | |
| 2011/0179116 A1* | 7/2011 | Solomon et al. | 709/204 |
| 2011/0231240 A1 | 9/2011 | Schoen et al. | |
| 2012/0004959 A1 | 1/2012 | Benyamin et al. | |
| 2012/0116186 A1* | 5/2012 | Shrivastav et al. | 600/301 |
| 2012/0158489 A1 | 6/2012 | Benyamin et al. | |
| 2012/0158518 A1 | 6/2012 | Benyamin et al. | |
| 2012/0179751 A1* | 7/2012 | Ahn et al. | 709/204 |
| 2012/0262461 A1* | 10/2012 | Fisher et al. | 345/467 |
| 2012/0323674 A1 | 12/2012 | Simmons et al. | |
| 2012/0323905 A1 | 12/2012 | Qiao | |
| 2013/0036107 A1 | 2/2013 | Benyamin et al. | |
| 2013/0179426 A1 | 7/2013 | Benyamin et al. | |
| 2013/0218678 A1 | 8/2013 | Benyamin et al. | |
| 2013/0232154 A1 | 9/2013 | Hall et al. | |
| 2013/0290091 A1 | 10/2013 | Benyamin | |
| 2014/0244400 A1 | 8/2014 | Benyamin et al. | |

OTHER PUBLICATIONS

Tam et al "Age Detection in Chat," Semantic Computing, 2009. ICSC '09. IEEE International Conference on, vol., no., pp. 33-39.*

Janssen, "Diachronical Text Classification", 2007, Thesis, program in Information Science, University of Groningen, The Netherlands, pp. 1-122.*

Spracklin, L.M., lnkpen, D.Z., & Nayak, A. (2008). Using the complexity of the distribution of lexical elements as a feature in authorship attribution, 2008, in LREC 2008 Proceedings, Marrakech, Morocco, pp. 3506-3513.*

Estival, "Author profiling for English emails", 2007, In Proceedings of the 10th Conference of the Pacific Association for Computational Linguistics (PACLING), pp. 263-272.*

Fissette, "Author identification in short texts", 2010, Master's thesis, Radboud University Nijmegen, 2010, pp. 1-51.*

Goswami et al, "Stylometric analysis of bloggers' age and gender", 2009, In Proceedings of the Third International ICWSM Conference, pp. 214-217.*

Orebaugh et al, "Data mining instant messaging communications to perform author identification for cybercrime investigations," 2010, In Digital Forensics and Cyber Crime, pp. 99-110.*

Rosenthal et al, "Age prediction in blogs: A study of style, content, and online behavior in pre- and Post-Social media generations", Jun. 2011, In Proceedings of ACL, pp. 763-772.*

Peersman et al, "Predicting age and gender in online social networks", 2011, In Proceedings of the 3rd Workshop on Search and Mining User-Generated Contents, pp. 1-8.*

Acar et al., "Modeling and Multiway Analysis of Chatroom Tensors", ISI'05 Proceedings of the 2005 IEEE international conference on Intelligence and Security Informatics, 13 pgs.

Gamon, "Sentiment classification on customer feedback data: noisy data, large feature vectors, and the role of linguistic analysis", Proceedings of the 20th international conference on Computational Linguistics, Association for Computational Linguistics, 2004, 7 pgs.

Garg et al., "Understanding Probabilistic Classifiers", Machine Learning: ECML 2001, 2001, 179-191.

Hein, "How Search Really Works: The Keyword Density Myth", Search Engine People, found on line at www.searchenginepeople.com/blog/how-search-really-works-the-keyword-density-myth.html, Feb. 1, 2008, 3 pgs.

Liu et al., "Personalized Web Search For Improving Retrieval Effectiveness", IEEE Transactions on Knowledge and Data Engineering, vol. 16, No. 1, Jan. 2004, 35 pgs.

Pearlman, "Facebook Ads", The Facebook Blog, found on line at blog.facebook.com/blog.php?post=6972252130, Nov. 6, 2007, 2 pgs.

"Automatic Expansion of Domain-Specific Lexicons by Term Categorization", ACM Transactions on Speech and Language Processing, vol. 3, No. 1, May 2006, pp. 1-30.

Ambekar et al., "Name-Ethnicity Classification from Open Sources", KDD '09, Jun. 28-Jul. 1, 2009, 9 pgs.

Androutsopoulos et al., "An Evaluation of Naive Bayesian Anti-Spam Filtering", Proceedings of the workshop on machine Learning in the New Information Age, 2000, pp. 9-17.

Argamon et al., "Gender, Genre and Writing Style in Formal Written Texts", Source and date unknown, 32 pgs.

Backstrom et al., "Find Me if You Can: Improving Geographical Prediction with Social and Spatial Proximity", WWW, 2010, 10 pgs.

Backstrom et al., "Network Bucket Testing", Source and date unknown, 10 pgs.

(56) References Cited

OTHER PUBLICATIONS

Bakshy et al., "Everyone's an Influencer: Quantifying Influence on Twitter", WSDM '11, Feb. 9-12, 2011, 10 pgs.
Bakshy et al., "The Role of Social Networks in Information Diffusion", Source and date unknown, 9 pgs.
Bernstein et al., "Eddi: Interactive Topic-based Browsing of Social Status Streams", UIST, 2010, 10 pgs.
Berwick, "An Idiot's Guide to Support Vector Machines (SVMs)", Source and date unknown, 25 pgs.
Blei et al., "Latent Dirichlet Allocation", Source and date unknown, 8 pgs.
Bollen et al., "Modeling public mood and emotion: Twitter sentiment and socio-economic phenomena", WWW, Apr. 2010, 10 pgs.
Burke et al., "Feed Me: Motivating Newcomer Contribution in Social Network Sites", CHI 2009, Apr. 4-9, 2009, 10 pgs.
Burke et al., "Social Capital on Facebook: Differentiating Uses and Users", CHI, 2011, 10 pgs.
Burke et al., "Social Network Activity and Social Well-Being", CHI 2010, 4 pgs.
Cer et al., "Parsing to Stanford Dependencies: Trade-offs between speed and accuracy", Source and date unknown, 5 pgs.
Chang, "Not-So-Latent Dirichlet Allocation: Collapsed Gibbs Sampling Using Human Judgments", Proceedings of the NAACL HLT 2010 Workshop on Creating Speech and Language Data with Amazon's Mechanical Turk, pp. 131-138.
Chang et al., "ePluribus: Ethnicity on Social Networks", Association for the Advancement of Artificial Intelligence, 2010, 8 pgs.
Ghosh et al., "Community Detection Using a Measure of Global Influence", 2nd SNA-KDD Workshop, 2008, 9 pgs.
Ghosh et al., "Structure of Heterogeneous Networks", Source unknown, Jun. 11, 2009, 8 pgs.
Go et al., "Twitter Sentiment Analysis", CS224N—Final Project Report, Jund 6, 2009, 17 pgs.
Go et al., "Twitter Sentiment Classification Using Distant Supervision", Source and date unknown, 6 pgs.
Hearst, "Trends & Controversies—Support Vector Machines", IEEE Intelligent Systems, Jul./Aug. 1998, pp. 18-28.
Joachims, "Text Categorization with Support Vector Machines: Learning with Many Relevant Features", Universitat Dortmund Fachbereich Informatik, Nov. 1997, 18 pgs.
Kim et al., "Literary Style Classification with Deep Linguistic Analysis Features", Source and date unknown, 7 pgs.
Kintsch, "Predication", Source and date unknown, 40 pgs.
Kintsch, "The Role of Knowledge in Discourse Comprehension: A Construction-Integration Model", Psychological Review, 1988, vol. 95, No. 2, pp. 163-182.
Kramer, "An Unobtrusive Behavioral Model of "Gross National Happiness"", CHI 2010: Language 2.0, Apr. 10-15, 2010, pp. 287-290.
Lerman, "Semantic Labeling of Online Information Sources", Source and date unknown, 19 pgs.
Li et al., "Keyword Extraction for Social Snippets", WWW 2010, Apr. 26-30, 2010, 2 pgs.
Lu et al., "Opinion Integration Through Semi-supervised Topic Modeling", WWW 2008, Refereed Track: Data Mining—Modeling, Apr. 21-25, 2008, pp. 121-130.
Meyer, "Support Vector Machines", Source unknown; Sep. 12, 2011, pp. 1-8.
Mishne, "Experiments with Mood Classification in Blog Posts", Style 2005, 8 pgs.
Pang et al., "Opinion Mining and Sentiment Analysis", Foundations and Trends in Information Retrieval, 2008, vol. 2, Nos. 1-2, pp. 1-135.
Ratkiewicz et al., "Detecting and Tracking the Spread of Astroturf Memes in Microblog Streams", Source unknown, Nov. 2010, 10 pgs.
Scott et al., "Text Classification Using WordNet Hypernyms", Source and date unknown, pp. 45-51.
Sun et al., "Gesundheit! Modeling Contagion through Facebook News Feed", Association for the Advancement of Artificial Intelligence, 2009, 8 pgs.
Tyler et al., "Retrieval Models for Audience Selection in Display Advertising", CIKM 2011, 6 pgs.
Wallach, "Topic Modeling: Beyond Bag-of-Words", Source unknown, Jun. 26, 2006, 40 pgs.
Wilson et al., "Term Weighting Schemes for Latent Dirichlet Allocation", Human Language Technologies: The 2010 Annual Conference of the North American Chapter of the ACL, pp. 465-473.
Zheng et al., "A Framework for Authorship Identification of Online Messages: Writing-Style Features and Classification Techniques", Journal of the American Society for Information Science and Technology, 2006, vol. 57, No. 3, pp. 378-393.
Press et al., "Numerical Recipes in FORTRAN 77", vol. 1 of Fortran Numerical Recipes: The Art of Scientific Computing, Cambridge University Press, 1992, 5 pgs.

\* cited by examiner

SHORT MESSAGE AGE CLASSIFICATION

CROSS-REFERENCE TO RELATED APPLICATIONS

The current application claims priority to U.S. Provisional Patent Application No. 61/472,527, filed Apr. 6, 2011, the disclosure of which is incorporated herein by reference.

FIELD OF THE INVENTION

The present invention relates to classification systems and more specifically to classifying users by user information, such as a user's age, based on short messages.

BACKGROUND OF THE INVENTION

Technology users generate a significant volume of text based data via the Internet. Users of all kinds can create text though blogs, websites, articles, and social media applications such as Facebook, Twitter and Instant Messages (IMs). Users can also communicate over mobile networks through texting or the Short Message Service (SMS) through mobile devices. The ability to harness the great volume of text created by users and to glean useful information from that text can provide many benefits. For example, classifying users by user information can be used for targeting marketing to a certain demographic or analysis of market penetration within a particular demographic. In general, user information is any information that can classify the user, such as a user's age or preferences.

Data mining is a branch of computer science that generally seeks to extract patterns from large data sets by combing methods from statistics and artificial intelligence with database management. However, there has been little work for analyzing short messages. Short messages are messages that are often only a few sentences or less, generally used where writing space is at a premium. Popular social networking services provide many services for generating short messages, like Twitter messages or Facebook statuses, which utilize messages that are typically much shorter in length than full web pages. This brevity makes it increasingly difficult to use current data mining techniques specifically designed to analyze full pages of text to extract information from the increasingly large body of short messages being created via social networking services. Additionally, in recent years there has been an increase in the number of very short documents, usually in the form of user generated messages or comments.

SUMMARY OF THE INVENTION

Systems and methods for short message age classification in accordance with embodiments of the invention are disclosed. In one embodiment of the invention, classifying messages using a classifier includes determining keyword feature information for a message using the classifier, classifying the determined feature information using the classifier, and estimating user age using the classifier.

In another embodiment of the invention, determining keyword feature information for a message includes feature information selected from the group consisting of: vowel/consonant ratio, capitalization, number of emoticons, punctuation, usage of texting slang, and keyword frequency.

In an additional embodiment of the invention, determining vowel/consonant ratio keyword feature information further includes counting the number of vowels in the message using the classifier, counting the number of consonants in the message using the classifier, and dividing the number of vowels in the message by the number of consonants in the message using the classifier.

In yet another additional embodiment of the invention, the letter 'y' is excluded from the number of vowels in the message and from the number of consonants in the message.

In still another additional embodiment of the invention, determining capitalization keyword feature information for a message further includes counting the number of capital letter in the message using the classifier.

In yet still another additional embodiment of the invention, determining emoticon keyword feature information for a message further includes counting the number of emoticons in the message using the classifier.

In yet another embodiment of the invention, determining punctuation keyword feature information for a message further includes removing emoticons from the message using the classifier and counting the number of punctuation marks in the message using the classifier.

In still another embodiment of the invention, determining usage of texting slang keyword feature information for a message further includes breaking the message into slang tokens using the classifier and counting the number of slang tokens using the classifier.

In yet still another embodiment of the invention, slang tokens are determined using a dictionary of texting slang and the classifier.

In yet another additional embodiment of the invention, determining keyword frequency further includes tokenizing a message using the classifier, where the message includes a set of words, filtering stop words using the tokenized message and the classifier, keyword stemming the filtered stop words and the classifier, and counting the stemmed keywords using the classifier.

In still another additional embodiment of the invention, tokenizing aggregate user data further includes breaking up the message into word using the classifier, where the words are contained in the set of words and creating a token for each word in the broken up message using the classifier.

In yet still another additional embodiment of the invention, the stop words are words in a message which do not provide useful information to the classifier.

Still another embodiment of the invention includes a classifier including memory configured to store aggregate user data, where the aggregate user data includes a set of messages and a processor, where the processor is configured to determine keyword feature information using aggregate user data, classify the determined feature information using a classifier application, and estimate user age using the classified feature information.

In yet another additional embodiment of the invention, the classifier application utilizes a Naïve Bayesian classifier.

In still another additional embodiment of the invention, the classifier application utilizes a maximum entropy classifier.

In yet still another additional embodiment of the invention, the processor is further configured to aggregate user data over a network.

In yet another embodiment of the invention, the processor is further configured to determine the keyword feature information using the aggregate user data and predetermined feature information.

In still another embodiment of the invention, the processor is further configured to determine the keyword feature information for a message contained in the set of messages using the classifier application.

In yet still another embodiment of the invention, the determined keyword feature information includes feature information selected from the group consisting of: vowel/consonant ratio, capitalization, number of emoticons, punctuation, usage of texting slang, and keyword frequency.

DETAILED DISCLOSURE OF THE INVENTION

Turning now to the drawings, systems and methods for classification of user information from short messages are disclosed. In many embodiments, user information is considered to be classifiable data about a user, such as a user's age or age group. Many embodiments perform classification of users by user information from short message text data found over a network. A number of embodiments collect user data from human validated users in human validated user classes to train a classifier. Certain embodiments employ a classifier to determine information concerning a user based upon the features of aggregated short message data. Various embodiments employ classifiers that classify users according to the user's age. Numerous embodiments utilize various features for classification such as vowel/consonant ratio, capitalization, emoticons (i.e. symbols indicating emotion), punctuation, texting slang and keyword frequency. Particular embodiments also utilize only keyword frequency as a feature for determining information concerning a user. Specific embodiments process keyword frequency as a feature through tokenization, stop word filtering and stemming of keywords.

In many embodiments, user information includes information such as a user's age. However, user information can span other aspects of a user such as a user's familiarity with technology, exposure to technology, education level, maturity level, typing/texting speed, interest in certain products or services, preferences, affiliations and other aspects of a user. User information can classify a user as an particular individual or an association of individuals such as individuals who use the same phone number, internet handle or computer terminal, for example students who use the same computer terminal at a school.

Although the present invention is described in certain specific aspects, many additional modifications and variations would be apparent to those skilled in the art. It is therefore to be understood that the present invention can be practiced otherwise than specifically described. Thus, embodiments of the present invention should be considered in all respects as illustrative and not restrictive.

Classifier Connected to a Short Message Network

Figure 1:
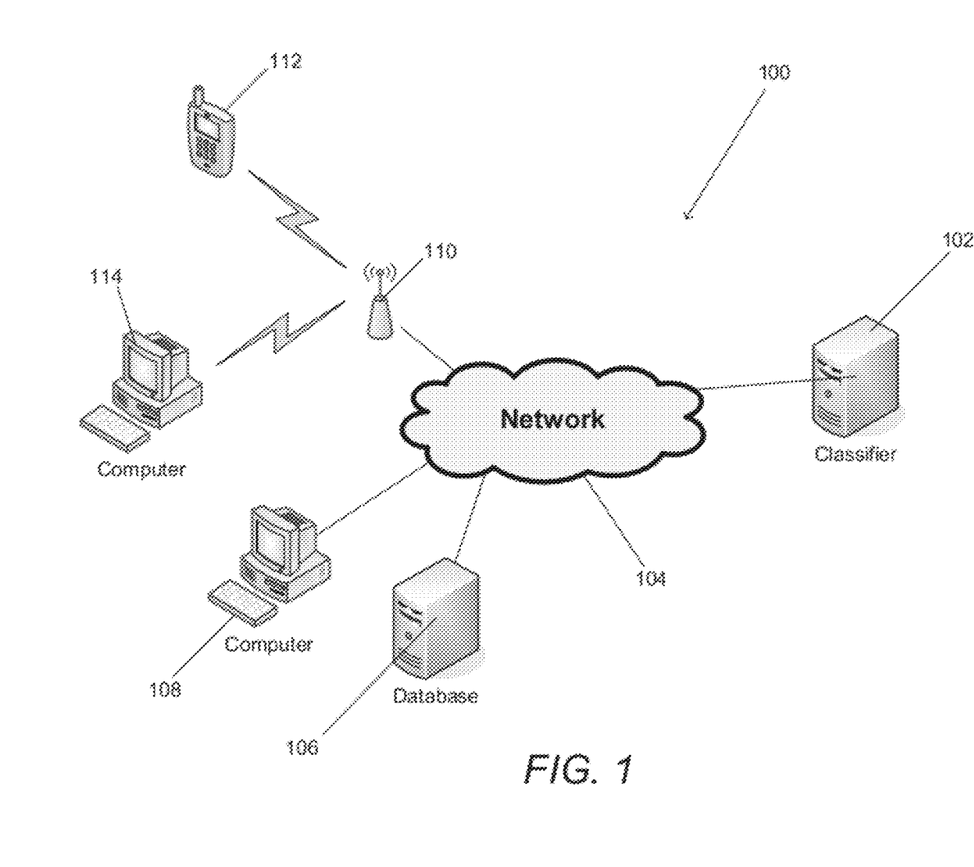
FIG. 1 is a network diagram illustrating a classifier connected to a short message network in accordance with an embodiment of the invention.

FIG. 1 is a network diagram illustrating a classifier connected to a short message network in accordance with an embodiment of the invention. The network diagram 100 includes a classifier 102 connected to a network 104. The network is also connected to a database 106, a computer 108 and a wireless receiver 110. The wireless receiver is connected to a mobile device 112 and a computer 114.

In many embodiments, the classifier contains a classifier application for classifying users by user information. Users can use various devices such as a mobile device, for example a mobile phone or wireless device, or perhaps a computer or a database containing user data. At times, the mobile device, computer or other device can be connected to a wireless receiver, which allows for the mobile device, computer or other device to connect to the network. The network connects the classifier to the various devices that a user can use in order for the classifier to access user data.

In the illustrated embodiment, a classifier can be employed to aggregate user data, such as Facebook messages, twitter messages or SMS messages, found over a network. The user data can then be processed by classifier to classify users based on information about or characteristics of the user.

In many embodiments, the classifier contains memory configured to store aggregate user data and/or any other data which may be utilized by the classifier. The memory may be volatile storage and/or non-volatile storage, including any form of storage utilized in a classifier, such as disc-based storage.

Classifier Process to Classify Users by User Information

Figure 2:
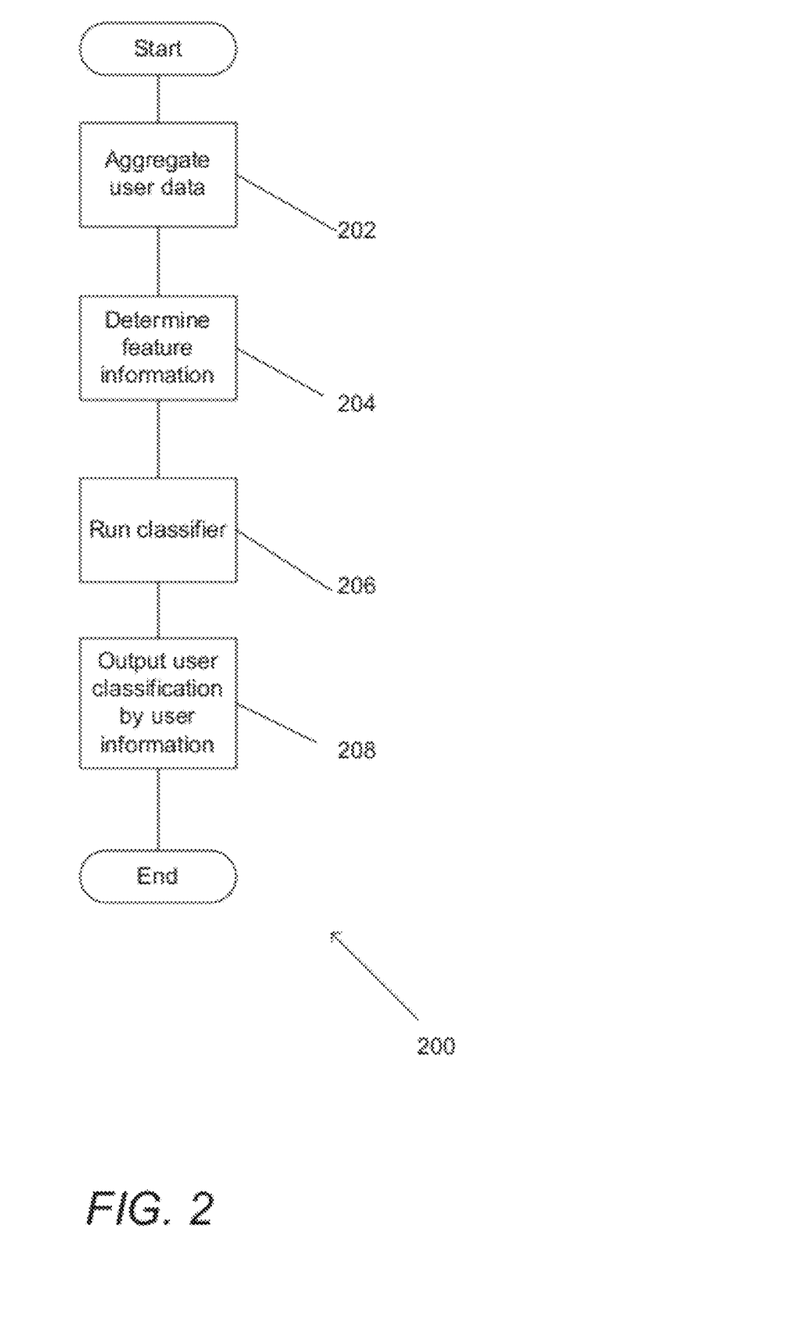
FIG. 2 is a flow chart illustrating a classifier process to classify users by user information, such as age, in accordance with an embodiment of the invention.

FIG. 2 is a flow chart illustrating a classifier process 200 to classify users by user information, such as age, in accordance with an embodiment of the invention. The process 200 begins by aggregating (202) user data. After aggregating (202) user data, feature information is determined (204). After feature information determination (204), a classifier is run (206). After the classifier is run (206), user classification by user information is output (208). After the user classification by user information is output (208), the process ends.

In many embodiments, user data is aggregated (202) over a network, as illustrated in FIG. 1. Aggregation of user data merely means that all relevant user data for particular users is aggregated. Feature information is determined (204) by separating out the raw user data by features relevant for classification by user information. Stated another way, feature information is the usable information for a classifier and is determined from features identified as relevant for the classifier. Features and/or feature information can be determined through a process of learning. Features and/or feature information can be predetermined, determined through running the classifier or both.

Features and/or feature information can correlate with a single feature or span several features. A classifier is run (206) by utilizing feature information. In certain embodiments, the classifier is a Naïve Bayesian classifier. In various embodiments the classifier is a maximum entropy classifier. Numerous embodiments use other classifiers based upon different statistical principles and/or algorithms. Various classifiers that can be utilized in accordance with embodiments of the invention are discussed below. The classifier is able to output (208) classification of users by user information.

In the illustrated embodiment, the classifier process 200 is able to take aggregated user data to classify users by user information. This is possible through running the aggregated raw user data though a classifier utilizing determined feature information in order to classify the user based upon a specific characteristic of the user. In various embodiments, the user information is age. Thereby, certain embodiments run a classifier process in which users are classified by age or age groups. However, in many embodiments user information can be of various other aspects of a user such as maturity, education, familiarity with technology as well as user preferences for certain products or services. A user can also be an individual or an association of individuals with a shared identity on a network, such as multiple users of a shared login account, same SMS telephone number or multiple users of a home or school computer terminal.

Training Short Message Classifiers

Classification is a process by which useful user information, or processed data about a user, can be distilled from aggregated user data, or unprocessed data relevant to a user. In many embodiments, classification involves utilizing certain identified features of aggregated data in order to distill useful user information, such as a user's age group. For example, the usage of complicated terminology in text can be a feature indicative of an adult rather than a child. Features are often used as independent variables that serve as predictors of a statistical relationship. Learning generally can be a process by which appropriate features are identified. In several embodiments, training (generally with assessment) is performed to build a classifier where features useful to classification are found by assessing pre-classified examples. Training can occur by instructing a classifier how to assess pre-classified examples. Training can be continuous or can be limited, such as by the types of pre-classified examples. Once a classifier is built, classification (generally with assessment) involves assigning new examples to classes based on specific features identified during the training of the classifier. In several embodiments, Naïve Bayes or Maximum Entropy classifiers are utilized to analyze short messages. In other embodiments, any of a variety of classifiers appropriate to a specific application can be utilized as a classifier.

Figure 2A:
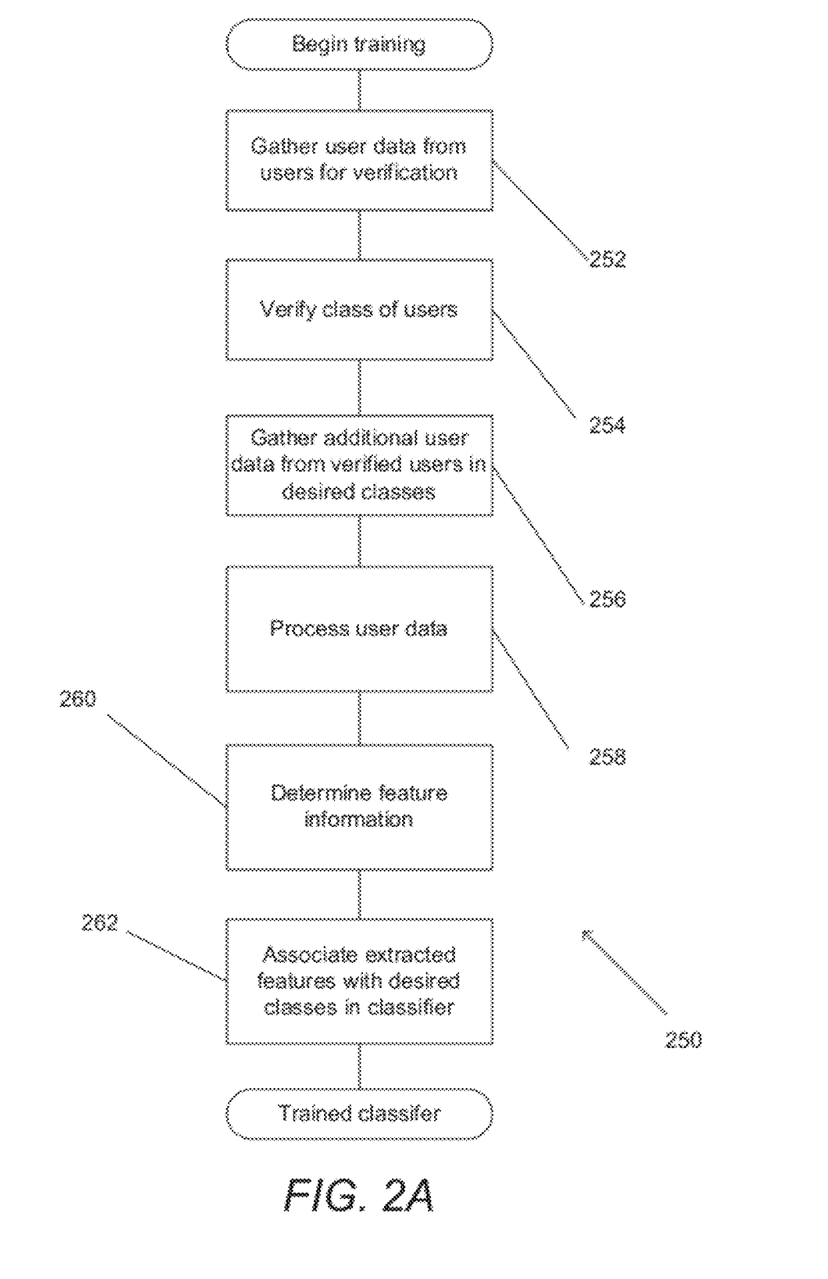
FIG. 2A is a flow chart illustrating a training process for a classifier in accordance with an embodiment of the invention.

FIG. 2A is a flow chart illustrating a training process for a classifier in accordance with an embodiment of the invention. The process 250 begins by gathering (252) user data from users for verification (254). After gathering (252) user data, classes of users are verified (254). After verification (254), additional user data from verified users in desired classes are gathered (256). After gathering (256) additional user data, user data is processed (258). After processing (258) user data, desired feature information is determined (260) from the user data. After determining (260) feature information, the features are associated (262) with desired classes in a classifier.

In many embodiments, gathering (252) user data from users for verification entails gathering information, such as text data, from users suspected to be of a given class, such as an age group. For example, a set of messages is gathered for each desired age groups (ex: 13-17, 18-24, 25-34, 35-54, and 55+) to classify by age groups. This can be accomplished by searching social networking sites for common phrases used by users to denote their birthdays such as "I turn 18 today!" or "It's my 50th birthday." Verification (254) of a class of users can occur as a human intelligence task where a human verifies that a user is of a certain class. For example, a human trainer can go through the user data to validate that each user was, in fact, denoting their own age as of the date on a short message. In other embodiments, any of a variety of phrases can be detected and used to verify certain characteristics of a specific user in accordance with embodiments of the invention. Once a specific user is verified as falling within a specific category, additional data can be gathered (256) concerning the users in desired classes for use in the training of a classifier. For example, a long history of messages is pulled for each of these users, resulting in a full training set of messages from users that are verified to be in the desired age groups (i.e. the age of the user at the time the message was generated is known). User data can be processed (258) to filter out any undesired user data. For example, each message can be tokenized into words and then filtered through a set of stop words (and, the, but, etc.) to remove noise. The keywords are then stemmed to unify occurrences of the same term but with different suffixes (listen, listening, listened, etc.). Certain embodiments do not have processing (258) but perform determination (260) of feature information after gathering (256) user data.

Once a set of verified user data is collected, a classifier can be trained by determining (260) statistically relevant features. For example, the occurrence of emoticons can be a feature of interest and the number of occurrences of emoticons can be feature information. A classifier is then trained to associate (262) extracted features with desired classes. For example, a classifier can be instructed to associate a user with a certain class from the occurrence of a certain number of emoticons in a single message for a certain user.

In the illustrated embodiment, training generally occurs for a classifier before the classifier classifies user data and associated users. Once a classifier is trained, the classifier can continuously classify users by their user data. A classifier can also be continuously trained to capture changes in the manner that language is used in short messages. For example, certain features can have different associations with classes at certain time periods or different geographical locations.

A Naïve Bayes classifier is a simple probabilistic classifier based on applying Bayes' theorem (Bayesian statistics) with strong (Naïve) independence assumptions. An expression for a Naïve Bayes classifier is as follows:

$$\text{classify}(f_1, \ldots, f_n) = \underset{c}{\mathrm{argmax}}\, p(C=c) \prod_{i=1}^{n} p(F_i = f_i \mid C=c).$$

This is where C is a dependent class variable with a small number of outcomes or classes conditional on several feature variables $F_1$ through $F_n$ and features n.

A Naïve Bayes classifier assumes that the presence or absence of a particular feature of a class is unrelated to the presence or absence of any other feature. For example, a fruit may be considered to be an orange if it is orange in color, round and about 3 inches in diameter. Even if these features depend on each other or upon the existence of the other features, a Naïve Bayes classifier considers all of these properties to independently contribute to the probability that this fruit is an orange. The Naïve Bayes classifier requires a relatively small amount of training data to estimate the parameters, such as the means and variances of the variables, necessary for classification. As independent variables are assumed, training simply involves determining the variance of the variables for each class and need not involve determining the entire covariance matrix.

A maximum entropy classifier is a classifier implemented using a multinomial logit or multinomial logistic regression model. A typical expression for a maximum entropy classifier is as follows:

$$Pr(y_i = j) = \frac{\exp(X_i \beta_j)}{1 + \sum_{j=1}^{J} \exp(X_i \beta_j)}$$

A typical expression to ensure identifiably is as follows:

$$Pr(y_i = 0) = \frac{1}{1 + \sum_{j=1}^{J} \exp(X_i \beta_j)},$$

In the two expressions directly above, for the ith individual, $y_i$ is the observed outcome and $X_i$ is a vector of explanatory variables. The unknown parameters $\beta_j$ are typically estimated by maximum a posteriori (MAP) estimation, which is an extension of maximum likelihood estimation using regularization of the weights to prevent pathological solutions (usually a squared regularizing function, which is equivalent to placing a zero-mean Gaussian prior distribution on the weights, but other distributions may also be possible). The solution is typically found using an iterative procedure such as iteratively reweighted least squares (IRLS) or, more commonly these days, a quasi-Newton method such as the L-BFGS method.

Maximum entropy classifiers can be used as alternatives to Naïve Bayes classifiers because they do not require statistical independence of the independent variables, commonly known as features that serve as predictors. However, learning in such a model may be significantly slower than for a Naïve Bayes classifier. For example, learning in a Naïve Bayes classifier is a matter of counting up the number of co-occurrences of features and classes, while in a maximum entropy classifier the weights, which are typically maximized using a maximum a posteriori (MAP) estimation, must be learned using an iterative procedure.

Although specific classifiers are described above including Naïve Bayes and maximum entropy classifiers, any of a variety of classifiers can be utilized to analyze short message in accordance with embodiments of the invention.

Classifier Process with Various Features where User Information is Age

Figure 3:
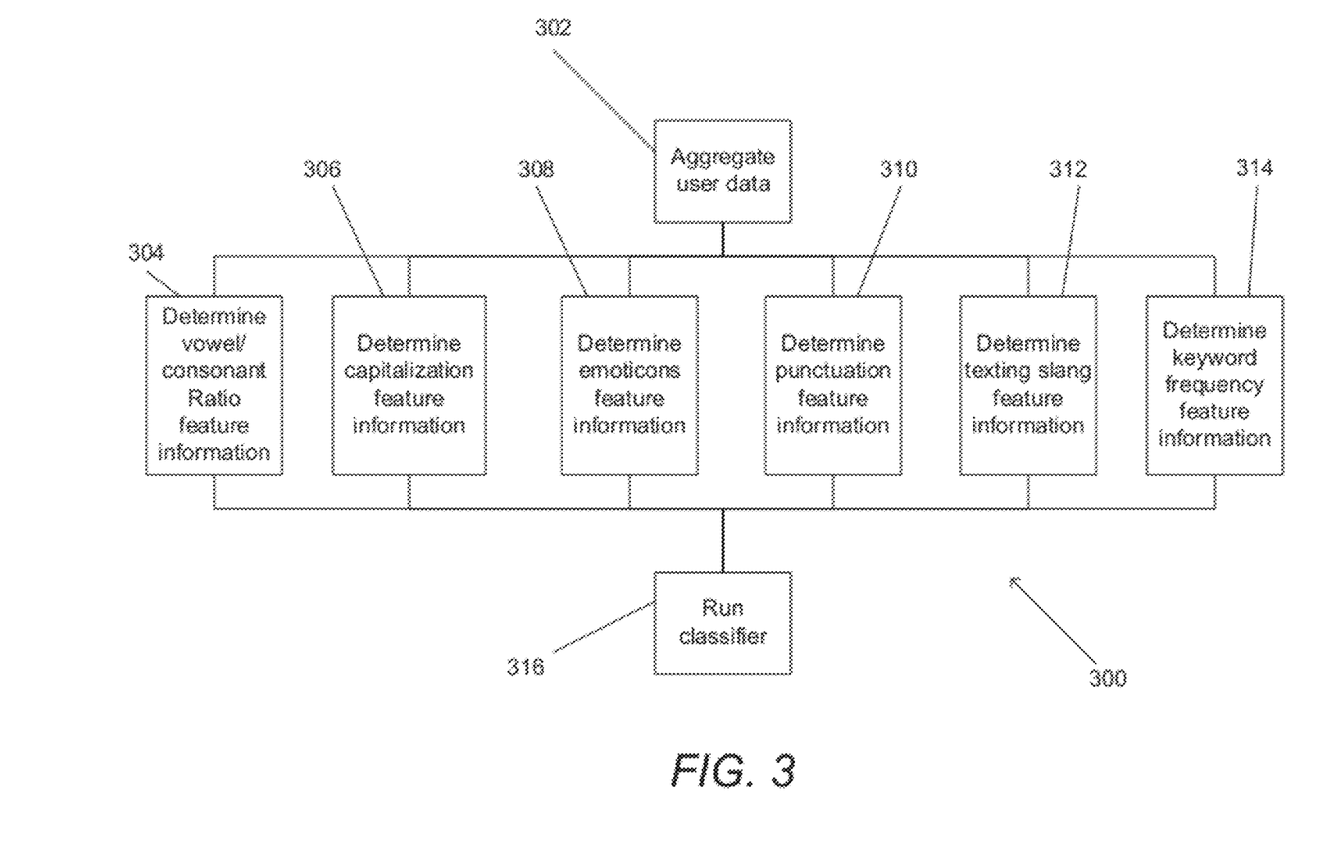
FIG. 3 is a flow chart illustrating a classifier process where various features are used and age is the user information in accordance with an embodiment of the invention.

FIG. 3 is a flow chart illustrating a classifier process 300 where a number of specific features are used to determine the age of a person authorizing a set of short messages in accordance with an embodiment of the invention. The process 300 illustrated in FIG. 3 is similar to the process 200 illustrated in FIG. 2. Aggregated (302) data is processed to determine whether various features are present. In the illustrated embodiment, the features that are detected include vowel/consonant ratio 304, capitalization 306, number of emoticons 308, punctuation 310, usage of texting slang 312 and keyword frequency 314. These features are then provided to a classifier 316, which is configured to determine the age of the user that authored the aggregated short messages. In many embodiments, a Naïve Bayes classifier is used when feature information associated with multiple features is relevant, such as in this embodiment. Although a specific combination of features is identified in FIG. 3, a single feature, a subset of the illustrated features, and/or any of a variety of other features can be utilized to make determinations of any number of different characteristics of the user in accordance with embodiments of the invention. In addition, any of a variety of classifiers appropriate to a specific application can be utilized.

Feature information from a vowel/consonant ratio feature can be determined (304) by counting the number of consonants and the number of vowels in a message associated with a user from the aggregated user data. Respective "y"s can be excluded from each group. The number of vowels divided by the number of consonants can then be utilized as the feature information associated with this feature.

Feature information from capitalization as a feature can be determined (306) by counting the number of capital letters in a message associated with a user from aggregated user data. The number of capital letters can be utilized as an input to a classifier. The number of capital letters divided by the number of lowercase letters can also be utilized by a classifier in accordance with embodiments of the invention.

Feature information from emoticons can be determined (308) by counting the number of emoticons [e.g. ":)", ":(", ":]", "@>--", etc) in a message. Emoticons are text generally without literal meaning and used to convey emotions, pictures or ideas. The number of emoticons present within a short message can be provided as an input to an age classifier in accordance with embodiments of the invention.

Feature information from punctuation can also be determined (310) by first removing emoticons from the message. Next, the number of punctuation marks is counted. This count can be provided as an input to an age classifier and/or the number of punctuation marks divided by the number of alphabetic characters can also be provided as an input to the age classifier.

Feature information from texting slang can be determined (312) by breaking each message associated with a user into slang tokens. These slang tokens can be found in a dictionary of common texting slang and can be terms such as "H8", "LOL", "PPL", "TXT", etc). Slang tokens are generally terms that are not properly typed, written or spelled but can carry the same or a different meaning as complete words. For example, the slang token "LOL" can literally be from an abbreviated form of "laughing out loud" but does not necessitate that a user is actually laughing out loud but has found something humorous or amusing. In many embodiments, the number of slang tags and/or the number of specific slang tags is provided to a classifier to determine a characteristic of the user.

Feature information can also be determined using keyword frequency (314). Processes for determining keyword frequency are discussed further below.

In the illustrated embodiment, users are classified according to age. Therefore, age is the user information output by the classifier. In other embodiments, a variety of features are provided to a classifier in order to determine another characteristic of the user.

Figure 4:
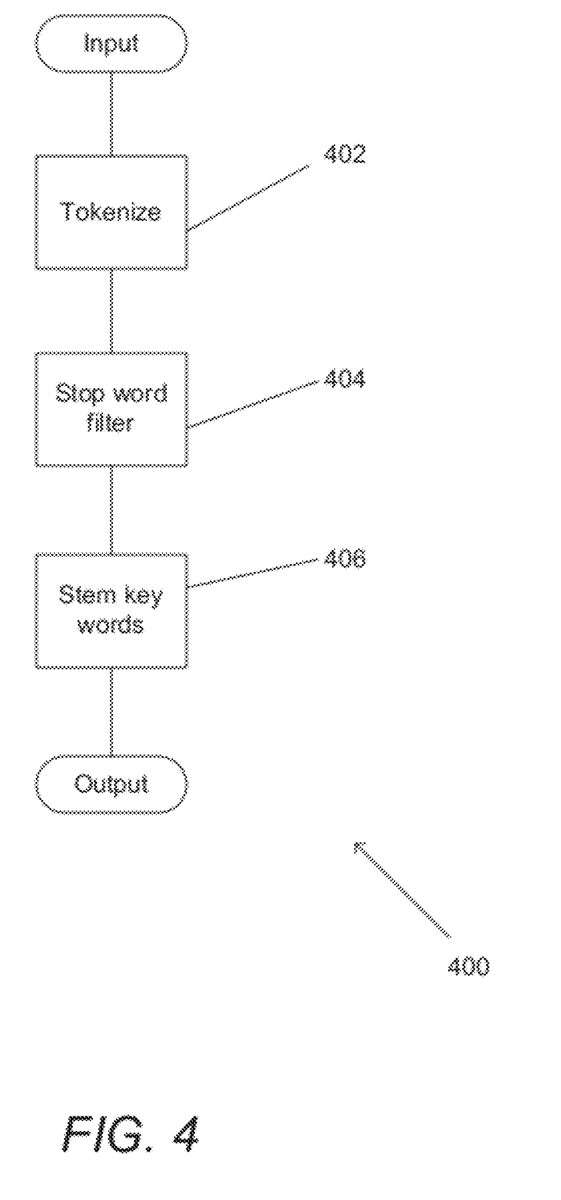
FIG. 4 is a flow chart illustrating determination of feature information associated with keyword frequency as a feature in accordance with an embodiment of the invention.

Determination of Feature Information Associated with Keyword Frequency as a Feature FIG. 4 is a flow chart illustrating a process for determining feature information associated with keyword frequency in accordance with an embodiment of the invention. In the illustrated process 400, text from aggregated user data is tokenized (402). The tokenized text is then stop word filtered (404). The stop word filtered text is then keyword stemmed (406). The count of the stemmed keywords and/or of specific keywords can then be provided to a classifier in accordance with embodiments of the invention.

In many embodiments, tokenizing (402) entails breaking up a stream of text into words. Here, this can be breaking up a short message into its constituent words. Stop word filtering filters out stop words. Stop words are words chosen for a particular purpose which may not be utilized in the same way with a different use. In several embodiments, stop words are filtered out as "noise" that do not provide useful information to a classifier. For example, in certain filters, stop words can be short function words such as "the", "and", "but", etc. Keyword stemming (406) can be utilized to unify occurrences of the same term in different forms, such as with different suffixes (e.g. listen, listening, listened, etc.).

Although a specific process is illustrated in FIG. 4 for determining keyword frequency, any of a variety of processes appropriate to a specific application can be utilized to identify and extract information from keywords that can be provided to a classifier in accordance with embodiments of the invention.

Classifier Process for User Age with Only a Keyword Frequency Feature

Figure 5:
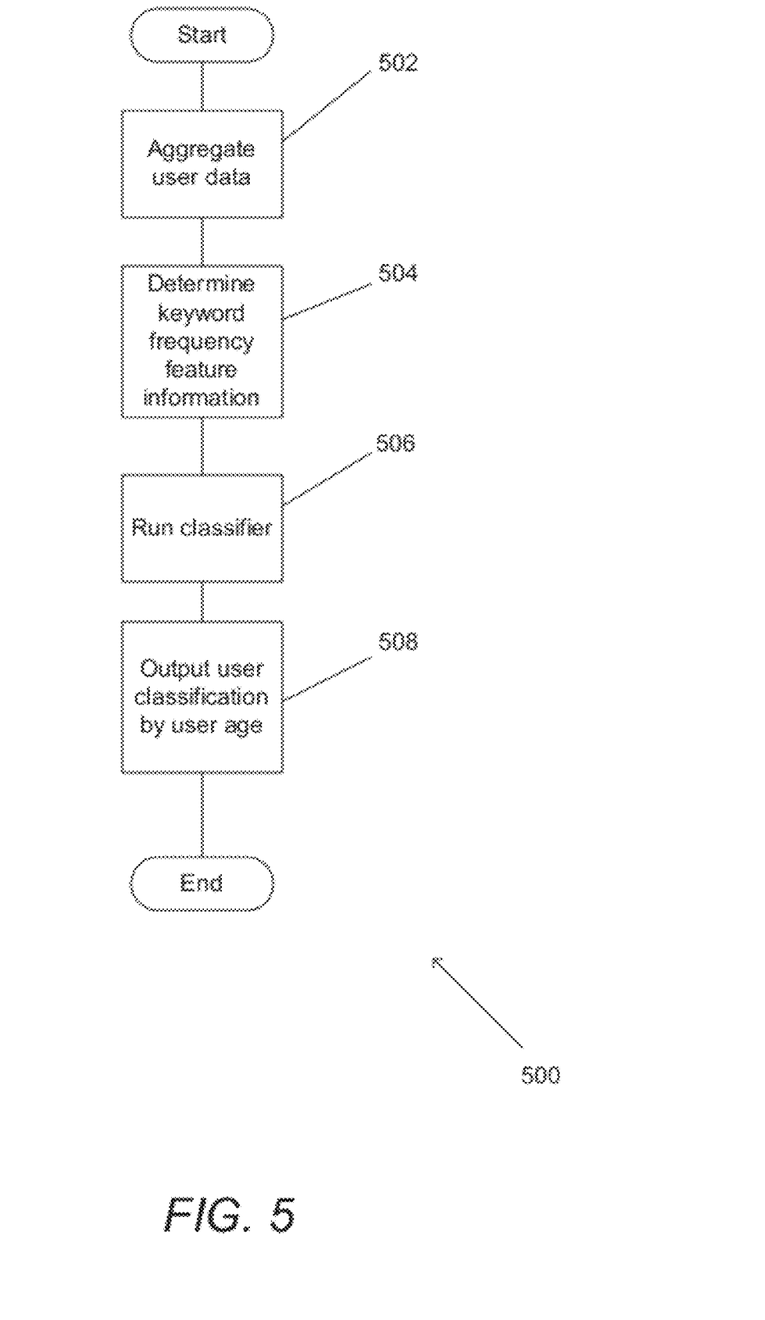
FIG. 5 is a flow chart showing a classifier process where age is classified from keyword frequency features in accordance with an embodiment of the invention.

FIG. 5 is a flow chart showing a classifier process 500 for user age classification utilizing keyword frequency in accordance with an embodiment of the invention. The classifier process 500 begins by aggregating (502) user data. From the aggregated (502) user data, frequency information related to a keyword frequency feature is determined (504). A classifier is then applied (506) using the feature information related to the keyword frequency or keyword frequencies. Based upon the keyword frequency information provided to the classifier, a user age estimate is output (508). In many embodiments, the classifier is a maximum entropy classifier. The classifier that is run (506), however, can be any classifier including but not limited to a Bayes classifier or other classifier. Keyword frequency feature information can be determined (504) through various processes, including the process illustrated in FIG. 4.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for classifying messages using a classifier, comprising:
   determining keyword feature information for a message using the classifier;
   classifying the determined feature information using the classifier, wherein the classifier retrieves a set of verified user data utilized to classify the feature information from a classifier memory and the verified user data is generated by:
      obtaining a set of training data comprising aggregated short message data;
      obtaining determined feature data for the set of training data, wherein the determined feature data comprises identified features of the set of training data describing the age of the users providing the aggregated short message data in the set of training data;
      determining training age data using the classifier by comparing the determined feature data to a set of pre-classified example data, wherein the pre-classified example data comprises a set of example short message data and a corresponding set of known age classification data, wherein each piece of example short message data has a known age described in the set of known age classification data; and
      verifying the training age data based on the pre-classified example data: and
      determining statistically relevant features in the verified training age data; wherein the statistically relevant features comprises features of interests within a piece of feature information being classified using the classifier;
   estimating user age data for the message based on the classified feature information using the classifier; and
   providing the estimated user age data in response to a request for user age data.

2. The method of claim 1, wherein determining keyword feature information for a message includes feature information selected from the group consisting of: vowel/consonant ratio, capitalization, number of emoticons, punctuation, usage of texting slang, and keyword frequency.

3. The method of claim 2, wherein determining vowel/consonant ratio keyword feature information further comprises:
   counting the number of vowels in the message using the classifier;
   counting the number of consonants in the message using the classifier; and
   dividing the number of vowels in the message by the number of consonants in the message using the classifier.

4. The classifier of claim 3, wherein the letter 'y' is excluded from the number of vowels in the message and from the number of consonants in the message.

5. The method of claim 2, wherein determining capitalization keyword feature information for a message further comprises counting the number of capital letter in the message using the classifier.

6. The method of claim 2, wherein determining emoticon keyword feature information for a message further comprises counting the number of emoticons in the message using the classifier.

7. The method of claim 2, wherein determining punctuation keyword feature information for a message further comprises:
   removing emoticons from the message using the classifier; and
   counting the number of punctuation marks in the message using the classifier.

8. The method of claim 2, wherein determining usage of texting slang keyword feature information for a message further comprises:
   breaking the message into slang tokens using the classifier; and
   counting the number of slang tokens using the classifier.

9. The method of claim 8, wherein slang tokens are determined using a dictionary of texting slang and the classifier.

10. The method of claim 2, wherein determining keyword frequency further comprises:
    tokenizing a message using the classifier, where the message includes a set of words;
    filtering stop words from the set of words using the tokenized message and the classifier;
    keyword stemming the filtered tokenized message using the classifier; and
    counting the stemmed keywords using the classifier.

11. The method of claim 10, wherein tokenizing a message further comprises:
    breaking up the message into words using the classifier, where the words are contained in the set of words; and
    creating a token for each word in the broken up message using the classifier.

12. The method of claim 10, wherein the stop words are words in a message that do not provide useful information to the classifier.

13. A classifier device, comprising:
    memory storing aggregate user data and a classifier application, where the aggregate user data includes a set of messages; and a processor, where the classifier application directs the processor to:

determines keyword feature information using aggregate user data;

classify the determined feature information, wherein the classifier comprises a set of verified user data utilized to classify feature information and the verified user data is generated by:

obtaining a set of training data comprising aggregated short message data;

obtaining determined feature data for the set of training data, wherein the determined feature data comprises identified features of the set of training data describing the age of the users providing the aggregated short message data in the set of training data;

determining training age data using the classifier by comparing the determined feature data to a set of pre-classified example data, wherein the pre-classified example data comprises a set of example short message data and a corresponding set of known age classification data, wherein each piece of example short message data has a known age described in the set of known age classification data; and verifying the training age data based on the pre-classified example data; and determining statistically relevant features in the verified training age data; wherein the statistically relevant features comprises features of interests within a piece of feature information being classified using the classifier;

estimate user age data the aggregate user data based on the classified feature information using the classifier application; and provides the estimated user age data in response to a request for the user age data.

14. The classifier of claim 13, wherein the classifier application utilizes a Naïve Bayesian classifier.

15. The classifier of claim 13, wherein the classifier application utilizes a maximum entropy classifier.

16. The classifier of claim 13, wherein the processor aggregates user data over a network.

17. The classifier of claim 13, wherein the processor determines the keyword feature information using the aggregate user data and predetermined feature information.

18. The classifier of claim 13, wherein processor determines the keyword feature information for a message contained in the set of messages using the classifier application.

19. The classifier of claim 13, wherein the determined keyword feature information includes feature information selected from the group consisting of:

vowel/consonant ratio, capitalization, number of emoticons, punctuation, usage of texting slang, and keyword frequency.

* * * * *